US012741889B2

(12) United States Patent
Noguchi et al.

(10) Patent No.: US 12,741,889 B2
(45) Date of Patent: Sep. 22, 2026

(54) WATER QUALITY MEASUREMENT SYSTEM AND WATER QUALITY MEASUREMENT METHOD

(71) Applicant: NOMURA MICRO SCIENCE CO., LTD., Atsugi (JP)

(72) Inventors: Yukio Noguchi, Atsugi (JP); Akira Tanji, Atsugi (JP)

(73) Assignee: NOMURA MICRO SCIENCE CO., LTD., Atsugi (JP)

( * ) Notice: Subject to any disclaimer, the term of this patent is extended or adjusted under 35 U.S.C. 154(b) by 441 days.

(21) Appl. No.: 18/322,746

(22) Filed: May 24, 2023

(65) Prior Publication Data

US 2023/0295018 A1 Sep. 21, 2023

Related U.S. Application Data

(63) Continuation of application No. PCT/JP2021/044653, filed on Dec. 6, 2021.

(30) Foreign Application Priority Data

Dec. 15, 2020 (JP) ................................ 2020-207669

(51) Int. Cl.
*C02F 1/44* (2023.01)

(52) U.S. Cl.
CPC ........ *C02F 1/444* (2013.01); *C02F 2201/005* (2013.01); *C02F 2209/36* (2013.01)

(58) Field of Classification Search
CPC .. C02F 1/444; C02F 1/008; C02F 1/00; C02F 1/44; C02F 1/02; C02F 1/18; C02F 2201/005; C02F 2209/36; C02F 2209/105; C02F 2103/04; B63B 13/00; G01N 33/1893; G01N 1/2035; G01N 1/00; G01N 1/44; G01N 2001/1012; G01N 2001/205; G01N 15/0618; G01N 15/06; G01N 33/18;
(Continued)

(56) References Cited

U.S. PATENT DOCUMENTS

2020/0049682 A1 * 2/2020 Fukuzawa .............. B63B 13/00

FOREIGN PATENT DOCUMENTS

JP 8-166378 A 6/1996
JP H 08166378 A * 6/1996 ............ G01N 33/18
(Continued)

OTHER PUBLICATIONS

JPH 08166378 A English description; Jun. 25, 1996; Ito Masayoshi et al.*

(Continued)

*Primary Examiner* — Akash K Varma
(74) *Attorney, Agent, or Firm* — Oblon, McClelland, Maier & Neustadt, L.L.P.

(57) ABSTRACT

A water quality measurement system 10 includes: a first pipe 11 through which a first treated water flows; a first branch pipe 11*a* branching from the first pipe 11 and having a first valve V11; a second pipe 12 through which a second treated water flows; a second branch pipe 12*a* branching from the second pipe 12 and having a second valve V12; a third pipe 13 connected to the first pipe 11 and the second pipe 12 and through which the first treated water and the second treated water flow; and a water quality measurement device 14 configured to measure a water quality of a treated water flowing through the third pipe 13.

14 Claims, 5 Drawing Sheets

(58) Field of Classification Search
CPC ........... G01N 2015/0662; G01N 27/26; G01N 27/27; G01N 27/49
USPC .......................................................... 210/418
See application file for complete search history.

(56) References Cited

FOREIGN PATENT DOCUMENTS

| | | | |
|---|---|---|---|
| JP | 2001-124692 | A | 5/2001 |
| JP | 2014-185904 | A | 10/2014 |
| JP | 2018-151174 | A | 9/2018 |
| KR | 10-2019-0128625 | | 11/2019 |

OTHER PUBLICATIONS

International Search Report issued Feb. 8, 2022 in PCT/JP2021/044653 filed on Dec. 6, 2021 2 pages.
Office Action issued Apr. 5, 2026, in corresponding Korean Patent Application No. 10-2023-7019484 (with English translation) citing documents 1 herein, 14 pages.

* cited by examiner

10
FIRST TREATED WATER
SECOND TREATED WATER
11
12
C1
C3
f1
C2
11a
13
12a
V11
WATER QUALITY MEASUREMENT DEVICE
14
V12

WATER QUALITY MEASUREMENT SYSTEM AND WATER QUALITY MEASUREMENT METHOD

CROSS-REFERENCE TO RELATED APPLICATIONS

This application is a continuation of prior International Application No. PCT/JP2021/044653 filed on Dec. 6, 2021 which is based upon and claims the benefit of priority from Japanese Patent Application No. 2020-207669, filed on Dec. 15, 2020; the entire contents of all of which are incorporated herein by reference.

FIELD

Embodiments relate to a water quality measurement system and a water quality measurement method for treated water and, for example, to a water quality measurement system and a water quality measurement method which measure the presence or absence of impurities such as a fine particle and a microorganism included in treated water with high purity such as a pharmaceutical water, a pure water, and an ultrapure water.

BACKGROUND

The ultrapure water used in a semiconductor manufacturing process, for example, for washing precision electronic parts such as a semiconductor wafer, an ultrapure water is required from which a dissolved electrolyte, a fine particle, a colloidal substance, a macromolecular organic matter, a pyrogen substance, and a dissolved gas which may promote proliferation of microorganisms are removed as much as possible.

Further, for the ultrapure water, it is performed to measure the number of impurities, for example, fine particles in the produced ultrapure water and confirm whether the ultrapure water has the water quality meeting the required level.

The measurement of the number of fine particles is generally performed by allowing the ultrapure water sampled for measurement from a production line of the produced ultrapure water to flow through piping to a fine particle measurement device being a measurement device. In this event, to decrease a measurement error in the number of fine particles, for example, there is a known fine particle measurement device which has a predetermined piping configuration in which only piping connects a branch point of supply pipes to a fine particle detector.

A known example of a water quality measurement system is improved in measurement accuracy by preventing water staying in the flow path from mixing into a sample in the case of performing the measurement of waters in a plurality of lines by the same measurement device by switching them by a valve in the water quality measurement of the water.

In this water quality measurement system, the flow path for the sampled water is made to have a predetermined line configuration and a switching valve capable of switching a flow of water is provided at a branch portion of the piping in order to switch the flow path. The provision of the switching valve as above makes it possible to control the water to be measured to correctly flow through the water quality measurement system at measurement.

SUMMARY

Incidentally, in the case where the waters in the plurality of lines are measurement objects and a switching valve is provided at the branch portion of the piping, the switching valve is switched to change the flow path, but there is a possibility of generation of a contaminant such as a fine particle due to the switching valve. Further, when switching the flow path by the switching valve, staying water is still generated from the water flowing until then occurs near the switching valve and may deteriorate in water quality due to the proliferation of microorganisms or the like, and may flow to the water quality measurement device at next switching.

Further, in the case of using a multi-way valve or the like which is generally used as the switching valve, there occurs a time when water does not temporarily flow at the switching (See, for example, FIG. 7A and FIG. 7B. FIG. 7 illustrates a time when water flows from a first flow path and FIG. 7B illustrates a middle of switching of the flow path), and the fluctuation in flow rate at the operation may lose the stability of the measurement device, thus possibly resulting in temporary instability in the operation of the measurement device.

The above phenomenon may bring about such a problem that in the case of water having very high purity such as an ultrapure water, the water quality of the produced ultrapure water is not correctly reflected but is wrongly evaluated. Further, to eliminate the influence, a long waiting time is required for the measured value to stabilize, leading to an increase in evaluation time.

Hence, an object of the embodiment is to provide a water quality measurement system and a water quality measurement method capable of measuring the water qualities of a plurality of treated waters by switching between lines passing through piping in the water quality measurement of an ultrapure water or the like, which can suppress the generation of a contaminant due to a device configuration of a switching valve or the like and measure the water quality of a treated water to be measured with high accuracy.

A water quality measurement system of the embodiment includes: a first pipe through which a first treated water flows; a first branch pipe branching from the first pipe and having a first valve; a second pipe through which a second treated water flows; a second branch pipe branching from the second pipe and having a second valve; a third pipe connected to the first pipe and the second pipe and through which the first treated water and the second treated water flow; and a water quality measurement device configured to measure a water quality of a treated water flowing through the third pipe. The third pipe has no valve on its entirety including a connection with the first pipe and the second pipe.

A water quality measurement method of the embodiment, includes: a first supply step of supplying a first treated water into a first pipe with a first branch pipe provided having a first valve; a second supply step of supplying a second treated water into a second pipe with a second branch pipe provided having a second valve; a switching step of closing the first valve and opening the second valve, or opening the first valve and closing the second valve, to allow one of the first treated water and the second treated water to flow through a third pipe connected to the first pipe and the second pipe; and a water quality measurement step of measuring a water quality of the first treated water or the second treated water flowing through the third pipe. The third pipe has no valve on its entirety including a connection with the first pipe and the second pipe.

According to the water quality measurement system and the water quality measurement method of the embodiment, no valve such as a flow path switching valve is provided on the flow path communicating with the water quality measurement system for the treated water when switching the measurement object in the water quality measurement of the first treated water and the second treated water, thereby making it possible to simplify the device configuration and perform the water quality measurement without going through the switching valve, so that the water quality measurement can be performed stably without interruption of the treated water to be supplied to the water quality measurement system.

Further, in the water quality measurement system and the water quality measurement method of the embodiment, since the treated water to be measured does not go through the flow path switching valve as explained above, no fine particles and the like due to the operation of the switching valve are generated and standing water staying in the piping is less likely to be generated, thereby suppressing contamination of the treated water due to them, resulting in that the water quality can be accurately and stably measured.

DETAILED DESCRIPTION

Hereinafter, a water quality measurement system and a water quality measurement method according to embodiments will be explained in detail with reference to FIG. 1A to FIG. 3.

First Embodiment

[Water Quality Measurement System]

Figure 1A:
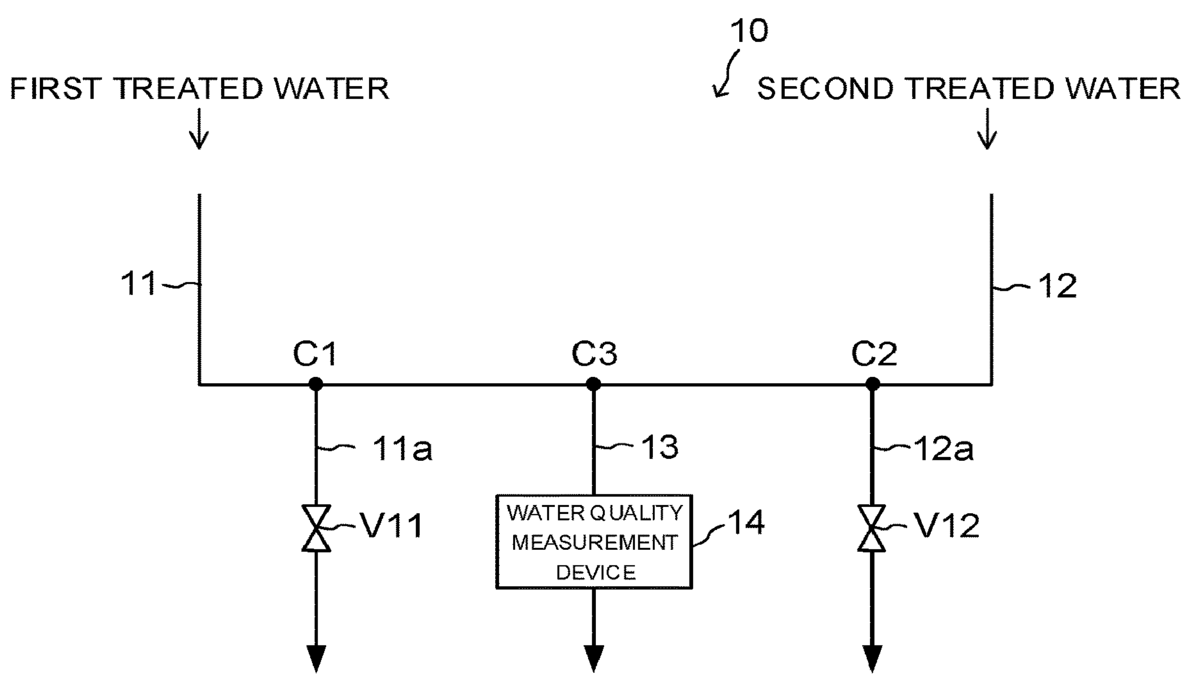
FIG. 1A is a diagram illustrating a schematic configuration of a water quality measurement system according to an embodiment.
Figure 1B:
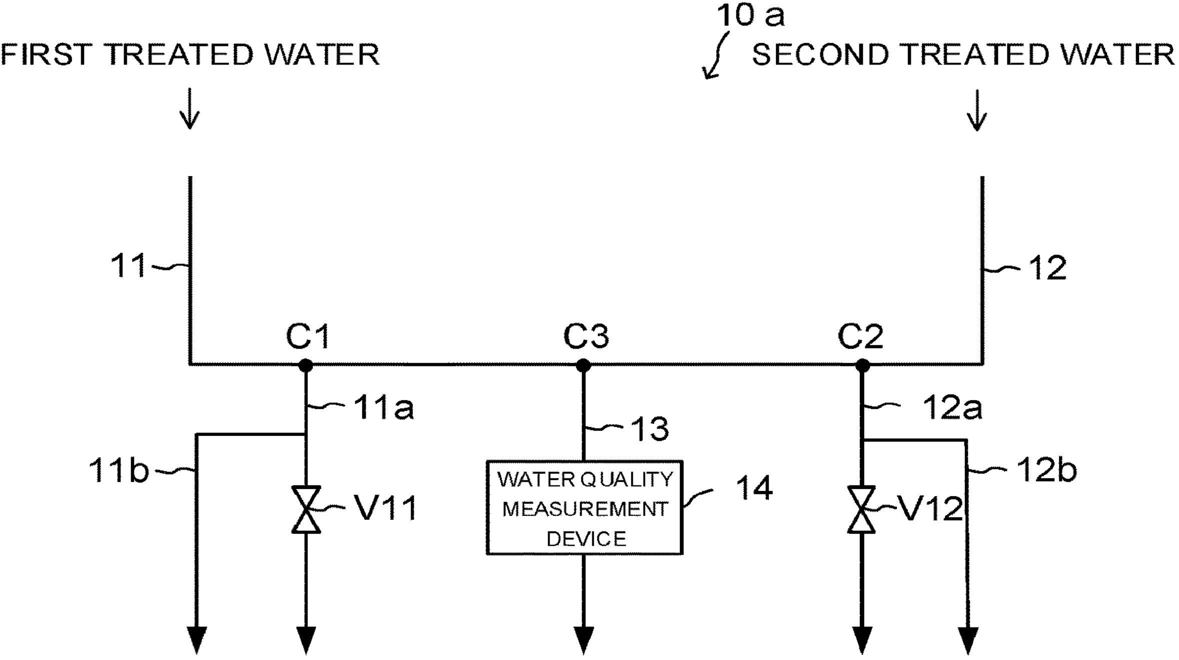
FIG. 1B is a diagram illustrating a schematic configuration of a water quality measurement system being a modification example of FIG. 1A.

As illustrated in FIG. 1A, a water quality measurement system 10 in this embodiment includes a first pipe 11, a first branch pipe 11*a*, a second pipe 12, a second branch pipe 12*a*, a third pipe 13, and a water quality measurement device 14.

The first pipe 11 allows a first treated water to flow therethrough, and the first pipe 11 is provided with the first branch pipe 11*a* that branches from a middle thereof. In FIG. 1A, a branch portion between the first pipe 11 and the first branch pipe 11*a* is illustrated as a branch point C1.

In this case, the first branch pipe 11*a* is provided with a first valve V11, its opening/closing can change whether to allow the first treated water to flow as it is through the first pipe 11 or to flow through the first branch pipe 11*a*. Accordingly, it is possible to arbitrarily decide whether to allow the first treated water flowing through the first pipe 11 to flow as it is through the first pipe 11 or to flow through the first branch pipe 11*a*.

This first valve V11 basically allows the first treated water to flow either through the first pipe 11 or the first branch pipe 11*a* by its opening/closing, and can also regulate an amount of the first treated water flowing through the first branch pipe 11*a* to a desired amount in the case of using a valve which can change the flow rate by adjusting its opening degree as the first valve V11.

At this time, for example, it is possible to allow the first treated water to flow mainly through the first pipe 11 and partially through the first branch pipe 11*a*. By allowing the first treated water to partially flow through the first branch pipe 11*a* as above, it is possible to effectively prevent the first treated water from staying between the branch point C1 and the first valve V11 in the first branch pipe 11*a*.

Even in the case of a form of completely closing the first valve V11, the first branch pipe 11*a* may be provided with a first escape pipe (drain) which can allow a small amount of the first treated water to flow thereinto and can drain it in order to prevent the stay, thereby similarly effectively preventing the stay of the first treated water.

The second pipe 12 allows a second treated water to flow therethrough, and the second pipe 12 is provided with the second branch pipe 12*a* that branches from a middle thereof. In FIG. 1A, a branch portion between the second pipe 12 and the second branch pipe 12*a* is illustrated as a branch point C2.

In this case, the second branch pipe 12*a* is provided with a second valve V12, its opening/closing can change whether to allow the second treated water to flow as it is through the second pipe 12 or to flow through the second branch pipe 12*a*. Accordingly, it is possible to arbitrarily decide whether to allow the second treated water flowing through the second pipe 12 to flow as it is through the second pipe 12 or to flow through the second branch pipe 12*a*.

This second valve V12 basically allows the second treated water to flow either through the second pipe 12 or the second branch pipe 12*a* by its opening/closing, and can also regulate an amount of the second treated water flowing through the second branch pipe 12*a* to a desired amount in the case of using a valve which can change the flow rate by adjusting its opening degree as the second valve V12.

At this time, for example, it is possible to allow the second treated water to flow mainly through the second pipe 12 and partially through the second branch pipe 12*a*. By allowing the second treated water to partially flow through the second branch pipe 12*a* as above, it is possible to effectively prevent the second treated water from staying between the branch point C2 and the second valve V12 in the second branch pipe 12*a*.

Even in the case of a form of completely closing the second valve V12, the second branch pipe 12*a* may be provided with a second escape pipe (drain) which can allow a small amount of the second treated water to flow thereinto and can drain it in order to prevent the stay, thereby similarly effectively preventing the stay of the second treated water.

The third pipe 13 is a pipe which is connected to the first pipe 11 and the second pipe 12 and can allow the first treated water and the second treated water to flow therethrough. In FIG. 1A, a connection with the first pipe 11 and the second pipe 12 is illustrated as a connection point C3.

The third pipe 13 is connected to the water quality measurement device 14 explained below, and allows treated water to be measured to flow therethrough for measurement. The third pipe basically allows one of the first treated water and the second treated water to flow therethrough. However, when switching between flow channels of the first treated water and the second treated water, mixed water in which the first treated water and the second treated water are mixed may temporarily flow therethrough.

The third pipe 13 has no valve such as a switching valve which changes the flow path including the connection with the first pipe 11 and the second pipe 12. In other words, as explained in the above background, in the case of switching among a plurality of flowing treated waters, generally, a switching valve is provided at a connection of pipes to allow a treated water to be measured to flow by the switching valve. In this regard, the switching valve is not provided in this embodiment, thus making it possible to suppress the generation of contaminants (fine particles and the like) due to the operation of the switching valve and establish a state where the treated water flows through the water quality measurement device at all times at switching, thereby stably measuring the water quality by the water quality measurement device.

The water quality measurement device 14 is a device which is connected to the third pipe 13 and measures the water quality of the treated water flowing through the third pipe 13. In short, in this embodiment, the water quality measurement device 14 can measure the respective water qualities of both the first treated water and the second treated water.

As the water quality measurement device 14, a publicly-known water quality measurement system can be used. The water quality measurement device 14 is not particularly limited, but the kind of device can be arbitrarily selected according to a desired measurement item in the treated water to be measured.

In this embodiment, the treated water is preferably a highly purified water such as a pharmaceutical water, a pure water, and an ultrapure water, and examples of the water quality measurement system used therefor include a fine particle measurement device (particle counter), a microorganism measurement device, and so on.

Here, the pharmaceutical water used for manufacturing pharmaceuticals and the like (for example, a purified water, a sterile purified water, an injection water) is produced, for example, by a refining treatment of using a tap water or the like as a raw water and passing the raw water through a water treatment device such as a reverse osmosis membrane device, an electrodeionization device, or the like to remove impurities in the raw water. The pharmaceutical water is required to have a predetermined water quality by the pharmacopoeia of each country and to be daily or periodically controlled in water quality.

The pure water and the ultrapure water are produced by using, for example, the tap water or the like as the raw water, treating it by a primary pure water device, and further treating it by a secondary pure water device as necessary. For example, the water quality of the pure water (primary pure water) has a resistivity of 17 MΩ cm or more, and the water quality of the ultrapure water (secondary pure water) has a resistivity of 18 MΩ cm or more.

The primary pure water device and the secondary pure water device used for producing the pure water and the ultrapure water only need to have configurations similar to that used for a publicly-known pure water production device (ultrapure water production device). For example, the primary pure water device is constituted by arbitrarily combining one or more of, for example, a reverse osmosis membrane device, a deaeration device (decarbonator, vacuum deaeration device, degassing membrane device, or the like), an ion exchange device (cation exchange resin device, anion exchange resin device, mixed bed ion-exchange resin device, electrodeionization device, or the like), and an ultraviolet oxidation device. Examples of the secondary pure water device include an ultrafiltration membrane device, a heat exchanger, an ultraviolet oxidation device, a hydrogen peroxide removing device, a degassing membrane device, a nonreproducing-type mixed bed ion exchange resin device (Polisher), and so on, and is constituted by arbitrarily combining these devices.

The case where the first branch pipe 11*a* has the first escape pipe and the second branch pipe 12*a* has the second escape pipe as explained above is illustrated in FIG. 1B. A water quality measurement system 10*a* illustrated in FIG. 1B has the same configuration as that of the water quality measurement system 10 illustrated in FIG. 1A expect that the water quality measurement system 10*a* has a first escape pipe 11*b* and a second escape pipe 12*b*.

[Water Quality Measurement Method]

Next, a water quality measurement method in this embodiment will be explained. The water quality measurement method will be explained using a case of using the water quality measurement system 10 illustrated in FIG. 1A as an example with reference to FIG. 2A and FIG. 2B.

The water quality measurement method in this embodiment includes: a first supply step of supplying a first treated water to a first pipe; a second supply step of supplying a second treated water to a second pipe; a switching step of allowing one of the first treated water and the second treated water to flow through a third pipe connected to the first pipe and the second pipe; and a water quality measurement step of measuring a water quality of the treated water flowing through the third pipe. Hereinafter, each of the steps will be explained in detail.

(First Supply Step and Second Supply Step)

The first supply step in this embodiment is a step of supplying the first treated water to the first pipe 11, and the first pipe 11 has the first branch pipe 11*a* provided with the first valve V11. Besides, the second supply step in this embodiment is a step of supplying the second treated water to the second pipe 12, and the second pipe 12 has the second branch pipe 12*a* provided with the second valve V12.

The first treated water and the second treated water supplied here are objects of water quality measurement, and are supplied when necessary. For example, in a case where the treated water is the ultrapure water and the water quality measurement is performed on a plurality of ultrapure water lines, its water quality is desired to be monitored at all times, and therefore the treated water is supplied at all times as the first treated water and the second treated water to the first pipe 11 and the second pipe 12, respectively.

The first treated water and the second treated water may be the same treated water or different treated waters. In the case where they are different treated waters, for example, it is only necessary to sample parts of the ultrapure water (treated water) from different production lines for water quality measurement on a plurality of ultrapure water production lines, and supply them to the first pipe and the second pipe, respectively.

(Switching Step)

Subsequently, the first valve V11 is closed and the second valve V12 is opened, or the first valve V11 is opened and the second valve V12 is closed to allow one of the first treated water and the second treated water to flow through the third pipe 13 connected to the first pipe 11 and the second pipe 12. "Closing" the first valve V11 and the second valve V12 includes not only the case of completely closing them but also the case of narrowing the flow paths by adjusting the opening degrees to drain parts of the treated waters herein.

Figures 2A, 2B:
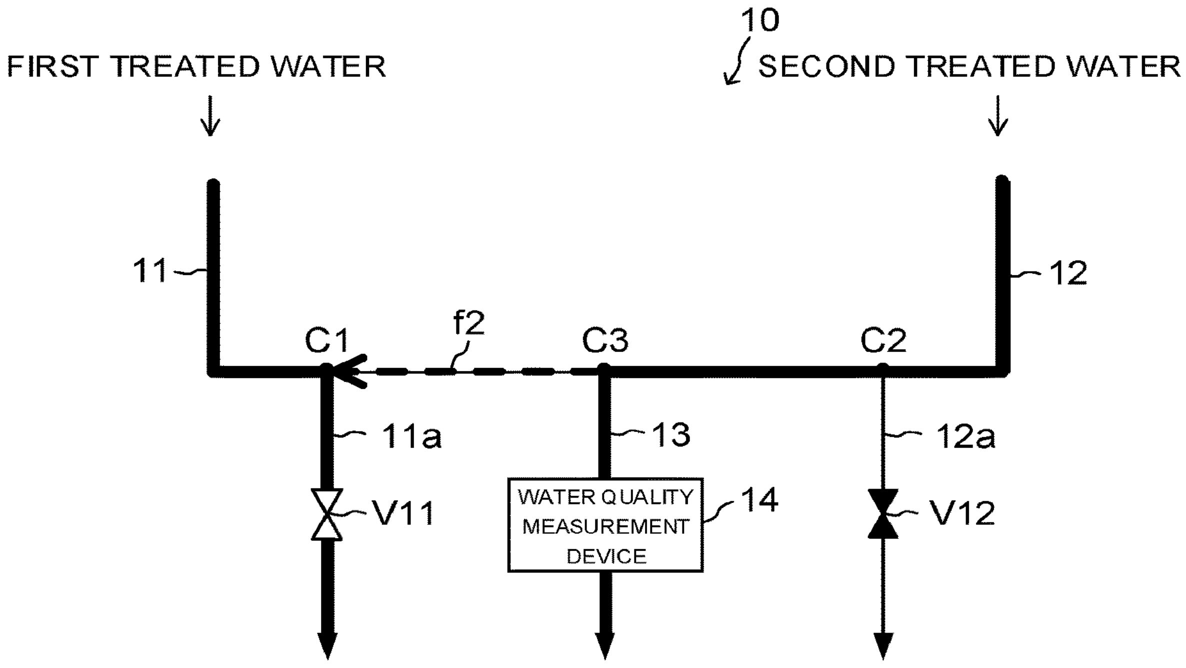
FIG. 2A is a diagram for explaining a flow of a treated water in the water quality measurement system in FIG. 1A.
FIG. 2B is a diagram for explaining the flow of the treated water in the water quality measurement system in FIG. 1A.

In other words, in a state where the first valve V11 is closed and the second valve V12 is opened, the flow through the first branch pipe 11*a* is stopped, so that the first treated water passes through the first pipe 11 and flows to the third pipe 13. In this event, the second treated water passes through the second pipe 12 and flows to the second branch pipe 12*a*. The flows are illustrated in FIG. 2A, in which main flows of the treated waters are indicated by thick solid lines. Regarding the opening/closing of the valves, a black-painted valve (first valve V11) represents closing and an outline valve (second valve V12) represents opening.

It is preferable, in this event, to set conditions of the piping configuration, flow rate, pressure, and so on so as to prevent the second treated water from mixing into the third pipe 13. In other words, part of the first treated water splits off from the connection point C3 to the branch point C2 (broken arrow f1 in FIG. 2A), passes through the second valve V12 and is drained. In order to confirm the fact that the mixing does not occur, it is only necessary to provide, for example, a flow rate sensor (clamp-on flow rate sensor or the like) between the branch point C2 and the connection point C3 and make sure that the first treated water is flowing from the connection point C3 to the branch point C2.

In the third pipe 13, the water quality measurement is performed by the water quality measurement device 14 for the flowing first treated water. In this event, the first treated water flows from the first pipe 11 into the third pipe 13, and no valve such as a switching valve is provided on a flow path to the water quality measurement device 14, so that its water quality is never contaminated by the operation such as opening/closing of the valve. It is more preferable that such a valve is not provided on a flow path reaching the water quality measurement device 14 after the treated water is introduced into the water quality measurement system.

Further, since the first treated water flows between the connection point C3 and the branch point C2, the adhesion of impurities to the pipe at this portion and the deterioration in water quality of staining water due to the stop of the flow do not occur, thereby preventing the deterioration in measured value due to the contamination when subsequently switching the flow path and measuring the second treated water. The second treated water is drained as it is from the second branch pipe 12*a*.

Further, in a state where the first valve V11 is opened and the second valve V12 is closed, the flow to the second branch pipe 12*a* is stopped, so that the second treated water passes through the second pipe 12 and flows to the third pipe 13. In this event, the first treated water passes through the first pipe 11 and flows to the first branch pipe 11*a*. The flows are illustrated in FIG. 2B, in which main flows of the treated waters are indicated by thick solid lines. Regarding the opening/closing of the valves, a black-painted valve (second valve V12) represents closing and an outline valve (first valve V11) represents opening.

It is preferable, in this event, to set conditions of the piping configuration, flow rate, pressure, and so on so as to prevent the first treated water from mixing into the third pipe 13. In other words, part of the second treated water splits off from the connection point C3 to the branch point C1 (broken arrow f2 in FIG. 2B), passes through the first valve V11 and is drained. In order to confirm the fact that the mixing does not occur, it is only necessary to provide, for example, a flow rate sensor (clamp-on flow rate sensor or the like) between the branch point C1 and the connection point C3 and make sure that the second treated water is flowing from the connection point C3 to the branch point C1.

In the third pipe 13, the water quality measurement is performed by the water quality measurement device 14 for the flowing second treated water. In this event, the second treated water flows from the second pipe 12 into the third pipe 13, and no valve is provided on a flow path to the water quality measurement device 14, so that its water quality is never contaminated by the opening/closing or the like of the valve. It is more preferable that such a valve is not provided on a flow path reaching the water quality measurement device 14 after the treated water is introduced into the water quality measurement system.

Further, since the second treated water flows between the connection point C3 and the branch point C1, the adhesion of impurities to the pipe at this portion and the deterioration in water quality of staining water due to the stop of the flow do not occur, thereby preventing the deterioration in measured value due to the contamination when subsequently switching the flow path and measuring the first treated water. The first treated water is drained as it is from the first branch pipe 11*a*.

In this embodiment, for the above water quality measurement of the first treated water and the second treated water, it is possible to decide which of the treated waters is allowed to flow through the third pipe 13 by switching the opening/closing of the first valve V11 and the second valve V12.

When measuring the water quality of the first treated water, the first valve V11 is closed, and in this event, it is preferable to set a flow rate ratio ($Q_{11}$:$Q_{11a}$) between a flow rate $Q_{11}$ flowing to the first pipe 11 and a flow rate $Q_{11a}$ flowing to the first branch pipe 11*a* from the branch point C1 to 10:0 to 8:2, and more preferably to 10:0 to 9:1

Further, when measuring the water quality of the second treated water, the second valve V12 is closed, and in this event, it is preferable to similarly set a flow rate ratio ($Q_{12}$:$Q_{12a}$) between a flow rate $Q_{12}$ flowing to the second pipe 12 and a flow rate $Q_{12a}$ flowing to the second branch pipe 12*a* from the branch point C2 to 10:0 to 8:2, and more preferably to 10:0 to 9:1.

In the above case, the flow rate Qila and the flow rate $Q_{12a}$ can also be said a flow rate of draining from the branch pipes to the outside depending on the adjustment of the opening degrees of the valves or on the case where the escape pipes are provided.

(Water Quality Measurement Step)

Next, the water quality of the treated water (first treated water or second treated water) flowing through the third pipe 13 is measured by the water quality measurement device 14.

The item to be measured is not particularly limited as long as it can be measured as the water quality, and preferable examples thereof include fine particles, microorganisms, and so on as described in the explanation of the water quality measurement device 14. The item to be measured herein corresponds to that measurable by the water quality measurement device 14 and can be arbitrarily selected depending on the required water quality or the like of the treated water.

In the case of measuring the fine particles in the water quality measurement, for example, a measurement object can be decided by setting desired characteristics according to the performance of the measurement device also regarding the size of the fine particle to be measured such as a fine particle having a particle diameter of 0.2 μm or more or a fine particle having a particle diameter of 0.05 μm or more.

The water quality measurement system and the water quality measurement method are explained above as the first embodiment, and by enabling the above water quality measurement, it is possible to perform the water quality measurement by switching between the first treated water and the second treated water without providing a switching valve at a branch portion or the like, thereby simplifying the device configuration.

Further, there is no need to use a switching valve, thus eliminating the possibility of the generation of contaminants such as fine particles and the like due to the switching valve, so that the measured result in the water quality measurement in this embodiment can be regarded as reflecting the water quality of the treated water as it is, leading to high reliability of the measured result.

Besides, there often occurs some timing when the treated water does not flow through the water quality measurement device at timing when switching the switching valve in the case of providing the conventional switching valve, whereas, by the water quality measurement method in this embodiment, the timing when the treated water does not flow is eliminated so that the measurement can be stably performed.

Which of the first treated water and the second treated water is allowed to flow through the water quality measurement device 14 in this embodiment is decided by the opening/closing of the first valve V11 and the second valve V12, and therefore it is preferable to provide a switching device for opening one of the valves and switching it. The switching device may be instructed to perform the opening/closing each time for switching or may be made to automatically perform switching in a predetermined time. Further, it is preferable that the switching is alternately performed at predetermined time intervals.

Second Embodiment

Next, a water quality measurement system and a water quality measurement method being a second embodiment will be explained with reference to FIG. 3.

Figure 3:
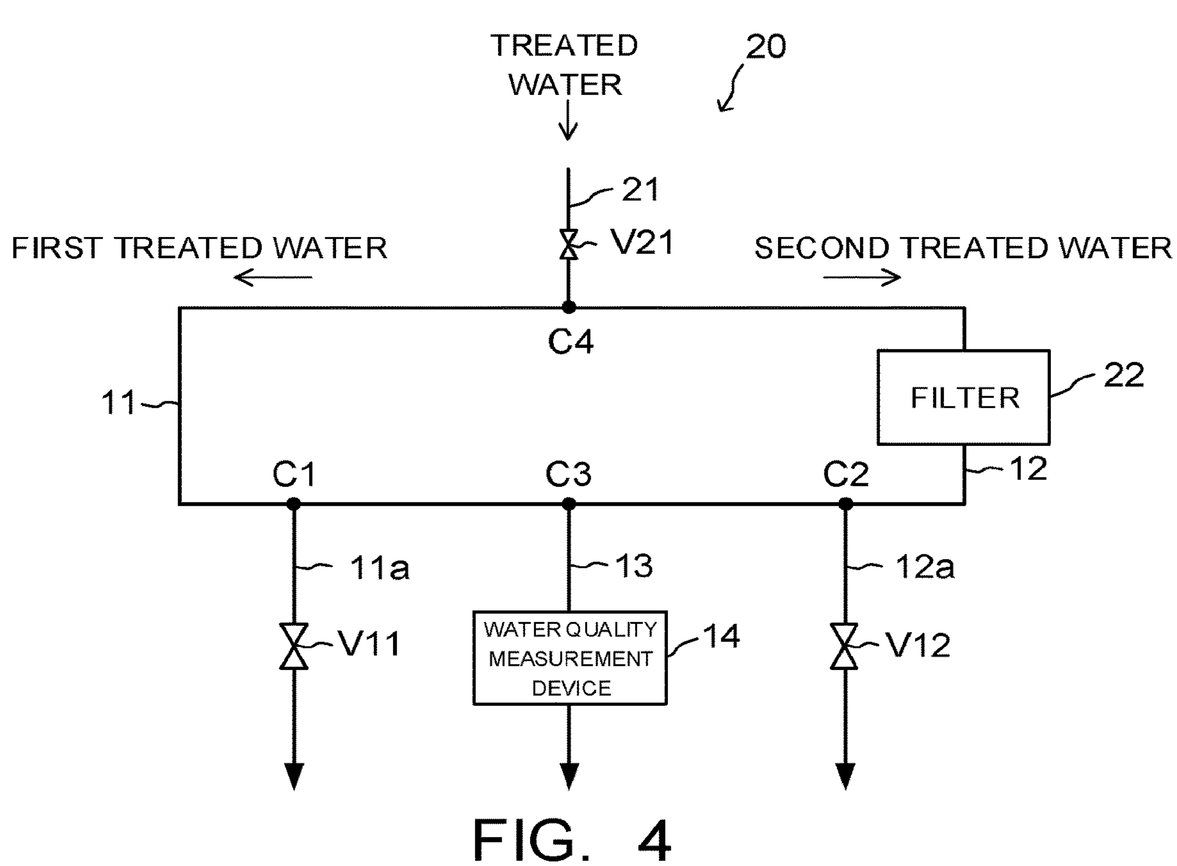
FIG. 3 is a diagram illustrating a schematic configuration of a water quality measurement system according to another embodiment.

As illustrated in FIG. 3, the water quality measurement system in the second embodiment is a water quality measurement system 20 including a first pipe 11, a first branch pipe 11*a*, a second pipe 12, a second branch pipe 12*a*, a third pipe 13, a water quality measurement device 14, a fourth pipe 21 which can supply the same treated water to the first pipe 11 and the second pipe 12 and has a supply valve V21, and a filter 22 provided on the second pipe 12.

Here, the same numerals are given to the same configurations as those in the first embodiment to omit explanation of them. In short, the characteristic configurations in the second embodiment are the fourth pipe 21 having the supply valve V21 and the filter 22, and the different characteristic portions will be mainly explained.

In this second embodiment, the first pipe 11 and the second pipe 12 are connected at their upstream sides to the fourth pipe 21. The connection point is indicated as a connection point C4. The fourth pipe 21 is a treated water supply pipe capable of supplying a treated water to be measured. In other words, in this embodiment, the treated water flown through the fourth pipe 21 is separated to the treated water flowing through the first pipe 11 and the treated water flowing through the second pipe 12 so that the same treated water flows through them. Accordingly, the first treated water and the second treated water are the same treated water in this embodiment.

Further, the fourth pipe 21 has the supply valve V21, and the supply valve V21 is a valve which can decide whether to supply or not the treated water into the water quality measurement system 20 by its opening/closing.

The filter 22 is a filer which is provided on the second pipe 12 and can capture the item to be measured by the water quality measurement device 14. In other words, in the case where the water quality measurement device 14 is a fine particle measurement device, the filter 22 can capture fine particles being objects, and examples of the filter 22 include a microfiltration membrane (MF) an ultrafiltration membrane (UF) and so on. Besides, in the case where the water quality measurement device 14 is a microorganism measurement device, the filter 22 can capture microorganisms being objects, and examples of the filter 22 include a microfiltration filter (Nuclepore membrane or the like, more specifically, for example, HCPS Cartridge (Nomura Micro Science Co., Ltd., trade name)) and so on.

In this embodiment, the above device configuration keeps the first treated water as it is and allows the second treated water to pass through the filter 22 for the same treated water. The flow of the treated water thereafter is the same as the content explained in the first embodiment, in which the first treated water or the second treated water is sent to the water quality measurement device 14 by the opening/closing of the first valve V11 and the second valve V12, and the water quality of the sent treated water is measured.

The above configuration can measure the change in water quality of the treated water due to the presence or absence of the treatment in the filter 22.

By performing the water quality measurement, for example, if a trouble occurs in the production step of the ultrapure water and fine particles which should not be included are mixed therein, the fine particles are detected in the first treated water not subjected to filtering and no fine particles are detected (fine particles are reduced) in the second treated water treated in the filter 22, thus making it possible to determine the presence or absence of the trouble that has occurred in the ultrapure water production device.

Further, by the above water quality measurement, it is also possible to cope with the fluctuation in noise level (detection level) of the water quality measurement device 14. More specifically, in the case of using the fine particle measurement device as the water quality measurement device 14, when the noise level of the measured result of fine particles is high regarding the very clean treated water such as the ultrapure water, it is sometimes difficult to determine whether the fact represents a noise or the inclusion of fine particles.

However, in this embodiment, it is possible to determine whether the measured result represents a problem with the noise level or a problem with the ultrapure water production device even in this case. In other words, when there is no problem in the ultrapure water production device, the ultrapure water to be supplied satisfies the predetermined conditions and the number of fine particles included therein is very small.

In this event, in the case where the noise level of the water quality measurement device 14 is low enough, very small numbers of fine particles in both the first treated water and the second treated water are obtained as measured results. Besides, in the case where the noise level of the water quality measurement device 14 is high, small numbers of fine particles are measured in both the first treated water and the second treated water, but there is no difference in water quality (number of fine particles) by the treatment in the filter 22, and similar numbers of fine particles are obtained as measured results.

On the other hand, there is a problem in the ultrapure water production device, fine particles are detected in the first treated water, and the fine particles are captured and removed by the filter 22 and no fine particles are detected in the second treated water as explained above. Besides, in the case where the noise level of the water quality measurement device 14 is high, fine particles seem to be detected in both the first treated water and the second treated water, but in this case, the number of existing fine particles is detected in addition to the noise in the first treated water, whereas only noise is detected in the second treated water, so that it is possible to determine that a problem has occurred in the ultrapure water production device by comparing the measured results.

As explained above, in this embodiment, the comparison between the water quality measurement results of the first treated water and the second treated water enables the determination of whether a trouble occurs in the ultrapure water production device without being influenced by the noise level or the like of the water quality measurement device.

In this embodiment, it is preferable to alternately measure the water quality of the first treated water and the water quality of the second treated water for comparing the water qualities as above. To alternately measure the water qualities as above, it is preferable to provide a controller for performing control of alternately switching in a predetermined time the switching device for switching the opening/closing of the first valve V11 and the second valve V12.

In this event, the water quality measurement of the treated water can be automatically performed by using automatic valves such as electromagnetic valves for the first valve V11 and the second valve V12 to perform control of switching the opening/closing of them in a predetermined time, comparing the water qualities of the first treated water and the second treated water, and providing a notification device for making a notification of a warning when the difference between the water qualities exceeds a predetermined range.

In the case of alternately switching them in a predetermined time as above, the time interval can be set to a desired length. For example, when monitoring the water quality of the ultrapure water at all times, it is preferable that the controller switches between the first valve V11 and the second valve V12, for example, on 30-minute to 24-hour shifts to alternately send the treated water to be measured in water quality to the water quality measurement device 14. Besides, the times for measuring the first treated water and the second treated water may differ. For example, it is preferable to alternately send the first treated water and the second treated water with the measurement time of the first treated water set to one day to one week and the measurement time of the second treated water set to 30 minutes to two hours.

EXAMPLES

Hereinafter, the embodiment will be further explained through examples.

Example 1

As the water quality measurement system used in examples, the water quality measurement system 20 illustrated in FIG. 3 was prepared as a basic configuration.

As the water quality measurement system used here, the first branch pipe 11*a* and the second branch pipe 12*a* were provided respectively with the first escape pipe and the second escape pipe capable of draining the treated waters to the outside and keeping them flowing when the first valve V11 and the second valve V12 were closed, and the escape pipes, the first branch pipe 11*a*, the second branch pipe 12*a*, and the third pipe 13 were provided with flowmeters, respectively. The arrangement positions of the flowmeters were set to stages subsequent to the valves on the first branch pipe 11*a* and the second branch pipe 12*a*, and to a stage subsequent to the water quality measurement device (fine particle measurement device) 14 on the third pipe 13. Further, clamp-on flow rate sensors were provided between the branch point C1 and the connection point C3 and between the branch point C2 and the connection point C3, respectively.

The devices and parts constituting the water quality measurement system are specifically as follows.

Water quality measurement device (fine particle measurement device) 14: manufactured by PMS Ltd., Ultra DI 50 (trade name; minimum measurable particle diameter 0.05 μm)

First valve V11, second valve V12: manufactured by CKD Corporation, ADK11-15A (trade name; electromagnetic valve)

Filter 22: manufactured by Nihon Pall Ltd., Ultipleat SP DR (trade name; small capsule type (5 nm))

Flowmeter: TOKYO KEISO CO., LTD., P-060 (trade name)

Clamp-on flow rate sensor: KEYENCE CORPORATION, FD-X (trade name)

Besides, the ultrapure water was produced at 10 $m^3$/hr by treating it in sequence by an ultraviolet oxidation device (PHOTOSCIENCE JAPAN CORP., trade name: JPW 2×2; TOC-UV), a polisher (N-Lite charged with 200 L of MBSP), and an ultrafiltration membrane (Asahi Kasei Corp., trade name: OLT-6036VA; UF).

The above water quality measurement system was attached to a sampling valve provided at the exit of the ultrafiltration membrane of the ultrapure water production device, and the ultrapure water produced by the ultrapure water production device was introduced from the fourth pipe into the water quality measurement system.

The introduced ultrapure water was branched to the first pipe and the second pipe as the first treated water and the second treated water, respectively. Here, the first valve of the water quality measurement system was kept closed and the second valve was kept open, and the first treated water was first allowed to flow through the third pipe and the second treated water was treated by the filter and then allowed to flow to the second branch pipe side, so that the water quality of the first treated water was measured by the water quality measurement device.

In this event, it was confirmed by the clamp-on flow rate sensors that the first treated water flowed from the branch point C1 to the connection point C3 and that an excessive first treated water flowed from the connection point C3 to the branch point C2 at 0.2 L/min. Further, the flow rates confirmed by the flowmeters were about 0.1 L/min in the first escape pipe, 0 L/min in the first branch pipe, 1 L/min in the third pipe, 1.5 L/min in the second branch pipe, and 0.1 L/min in the second escape pipe.

Then, the opening/closing of the first valve and the second valve was switched to keep the first valve open and the second valve closed, and the first treated water flowed to the first branch pipe side and the second treated water was treated by the filter and then allowed to flow through the third pipe, so that the water quality of the second treated water was measured by the water quality measurement device.

In this event, it was confirmed by the clamp-on flow rate sensors that the second treated water flowed from the branch point C2 to the connection point C3 and that an excessive second treated water flowed from the connection point C3 to the branch point C1 at 0.2 L/min. Further, the flow rates confirmed by the flowmeters were about 0.1 L/min in the first escape pipe, 1.5 L/min in the first branch pipe, 1 L/min in the third pipe, 0 L/min in the second branch pipe, and 0.1 L/min in the second escape pipe.

Figure 4:
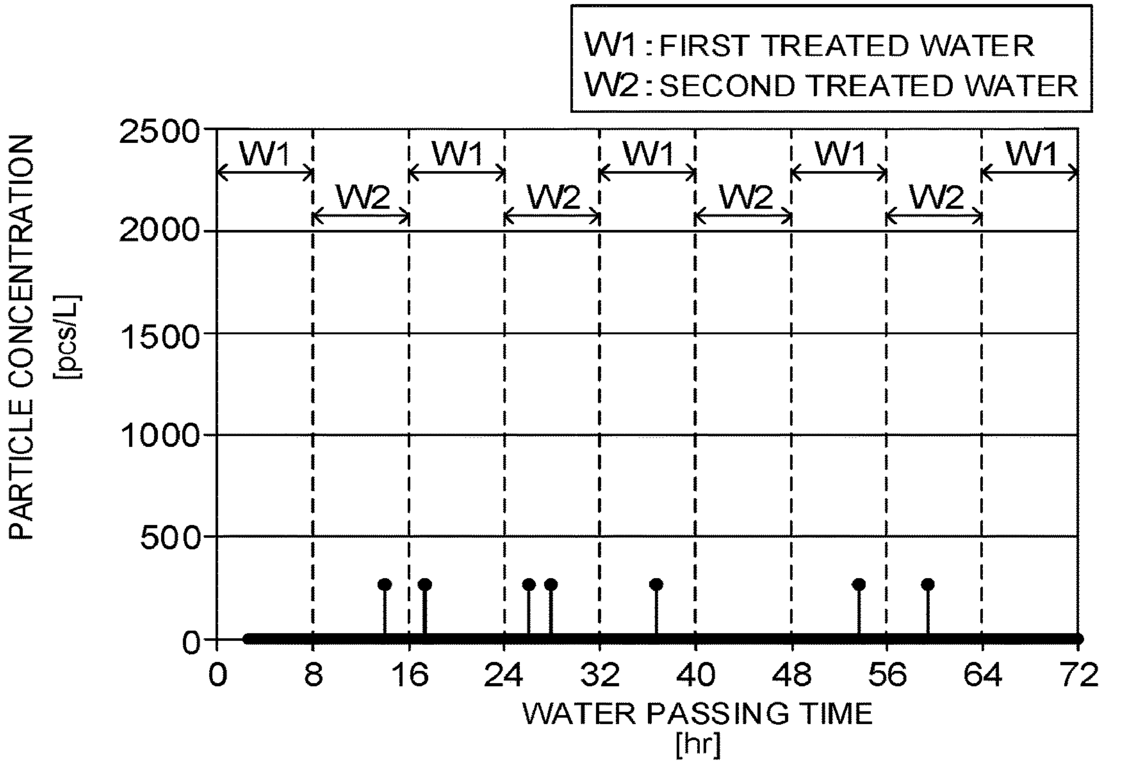
FIG. 4 is a graph illustrating measured results of the numbers of fine particles in Example 1.

The operation of switching between the first valve and the second valve was repeated as above every 8 hours, and the numbers of fine particles at that time were measured at 1-minute intervals by the fine particle measurement device, and the measured results are illustrated in FIG. 4. In this event, the diameter of the measured fine particle by the fine particle measurement device was set to 0.05 μm, so that the presence of fine particles having diameters more than that was detected. In FIG. 4, the time during which the water quality of the first treated water was measured is regarded as W1 and the time during which the water quality of the second treated water was measured is regarded as W2, and their lengths are indicated by lengths of double-arrow lines.

The measured results indicate that the ultrapure water had such a very good water quality that almost no fine particles were measured regardless of the presence or absence of the filter treatment and the average number of particles in the first treated water not filter-treated was about 0.5 pcs/L. From this fact, it can be understood that the ultrapure water production device normally works.

Example 2

Figure 5:
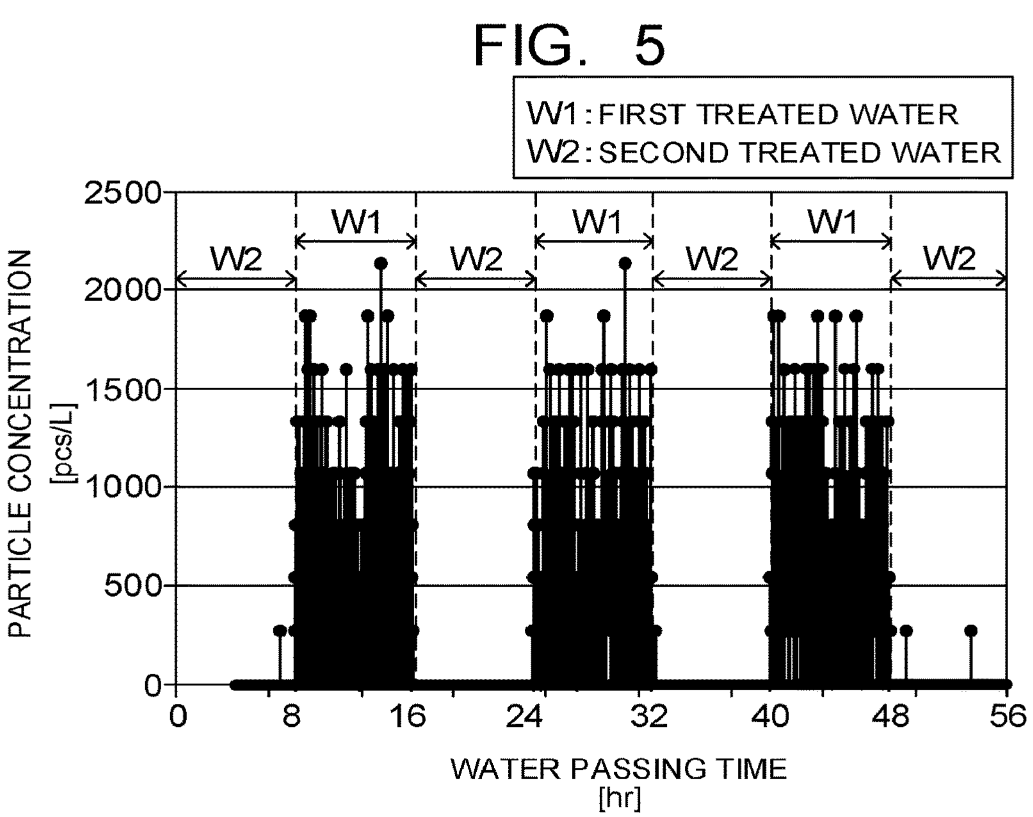
FIG. 5 is a graph illustrating measured results of the numbers of fine particles in Example 2.

The water quality measurement was performed using the same ultrapure water production device and water quality measurement system and by the same operation as those in Example 1. This example is an example in the case where fine particles are mixed in the ultrapure water produced by the ultrapure water production device, and the results of the fine particle measurement are illustrated in FIG. 5.

The measured results indicate that almost no fine particles were measured in the second treated water obtained by filter-treating the ultrapure water, whereas a large amount of fine particles were measured in the first treated water obtained by not filter-treating the ultrapure water. A large amount of fine particles were present such that the average number of particles in the first treated water not filter-treated in this case was about 500 pcs/L. This is thought because fine particles were mixed due to some trouble occurring in the ultrapure water production device. From this fact, the timing when performing repair, maintenance, or the like of the ultrapure water production device can be determined.

Example 3

Figure 6:
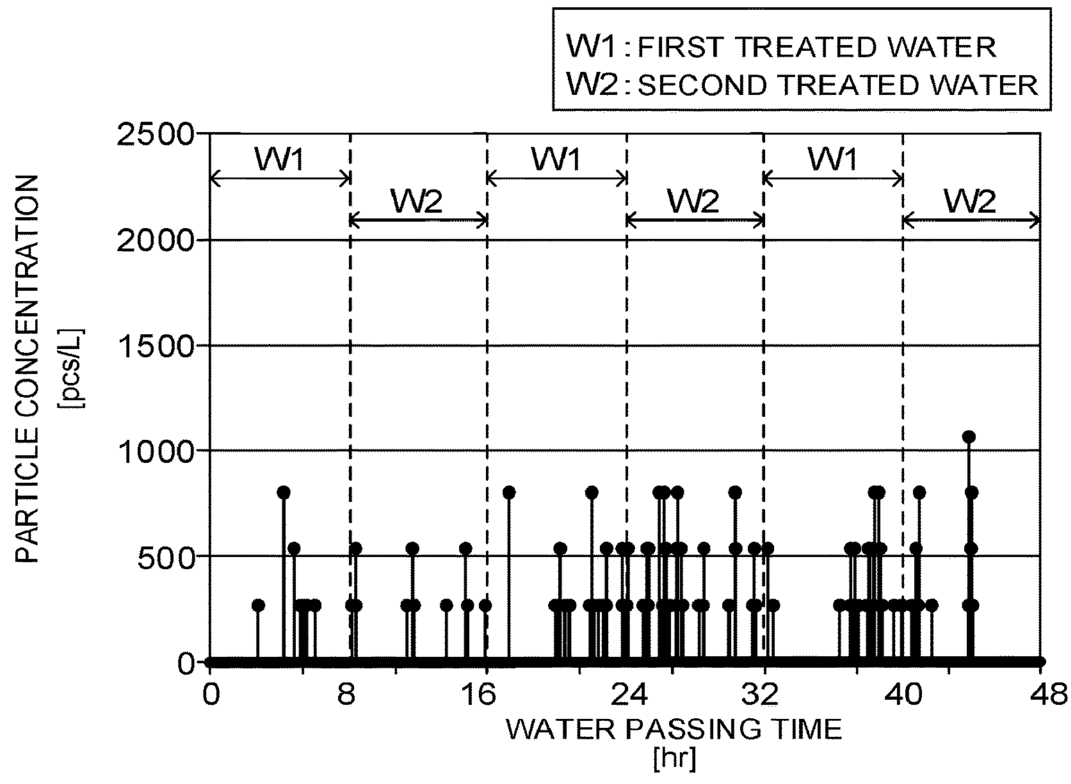
FIG. 6 is a graph illustrating measured results of the numbers of fine particles in Example 3.
Figure 7A:
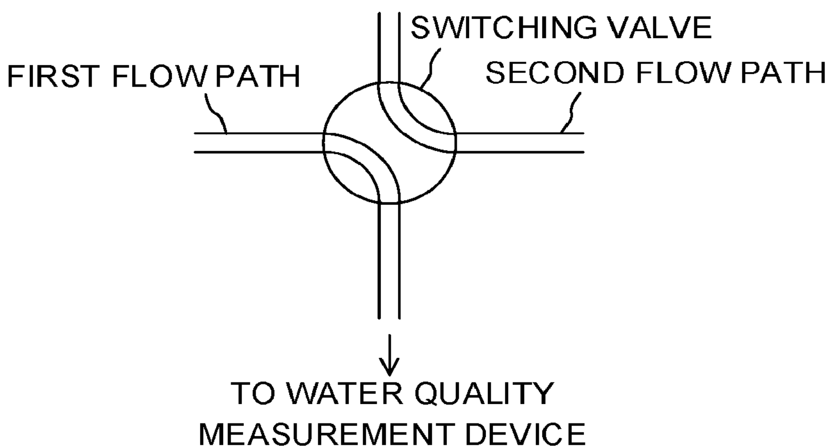
FIG. 7A is a diagram for explaining a problem when performing switching of a flow path by a switching valve.
Figure 7B:
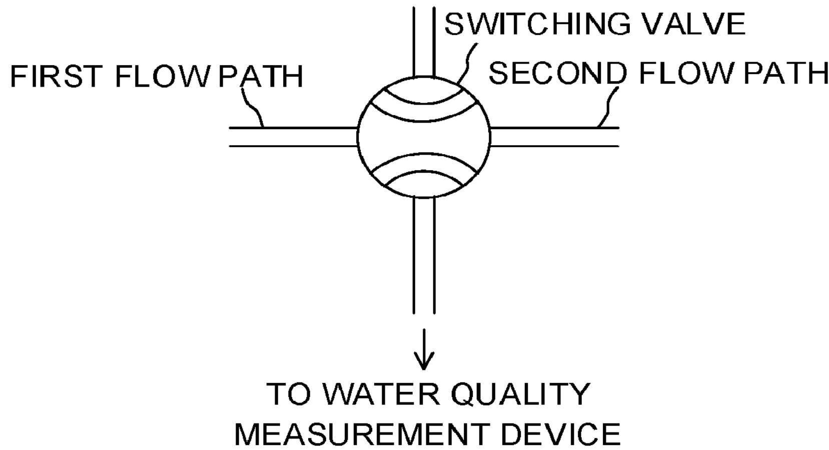
FIG. 7B is a diagram for explaining the problem when performing switching of the flow path by the switching valve.

The water quality measurement was performed using the same ultrapure water production device and the water quality measurement system having the same configuration and by the same operation as those in Example 1. The results of the fine particle measurement are illustrated in FIG. 6.

The measured results indicate that a small amount of fine particles were detected in the ultrapure water regardless of the presence or absence of the filter treatment. The average number of particles in the first treated water not filter-treated in this case was about 25 pcs/L, and it is difficult to determine only from the measured results whether the average number is the noise of the fine particle measurement device or the result of inclusion of a small amount of fine particles. However, in this example, the first treated water filter-treated also had the same tendency, so that it can be determined that the noise level of the water quality measurement device is high. Thus, it can be understood that the ultrapure water production device itself normally works.

From the above, according to this embodiment, no flow path switching valve is provided on the flow path communicating with the water quality measurement device for the treated water when switching the measurement object in the water quality measurement of the first treated water and the second treated water, thereby making it possible to simplify the device configuration and perform the water quality measurement without going through the flow path switching valve, so that the water quality measurement can be performed stably without interruption of the treated water to be supplied to the water quality measurement device.

Further, according to this embodiment, since the treated water to be measured does not go through the flow path switching valve as explained above, no fine particles and the like due to the operation of the flow path switching valve are generated and standing water staying in the piping is less likely to be generated, thereby suppressing contamination of the treated water due to them, resulting in that the water quality can be accurately and stably measured.

What is claimed is:

1. A water quality measurement system, comprising:

a first pipe through which a first treated water flows, the first treated water being a first ultra pure water;

a first branch pipe branching from the first pipe, the first branch pipe having a first valve;

a second pipe through which a second treated water flows, the second treated water being a second ultra pure water;

a second branch pipe branching from the second pipe, the second branch pipe having a second valve;

a third pipe connected to a connection between the first pipe and the second pipe and through which the first treated water and the second treated water flow; and a water quality measurement device configured to measure a water quality of a treated water flowing through the third pipe, wherein:

no switching valve is provided on a flow path of the first treated water to the water quality measurement device and on a flow path of the second treated water to the water quality measurement device, and the third pipe has no valve on its entirety including the connection.

2. The water quality measurement system according to claim 1, further comprising:

a switching device configured to switch opening/closing of the first valve and the second valve so that one of the first valve and the second valve is opened and another of the first valve and the second valve is closed.

3. The water quality measurement system according to claim 1, wherein:

the water quality measurement device is a fine particle measurement device or a microorganism measurement device.

4. The water quality measurement system according to claim 1, wherein:

the first pipe and the second pipe are connected to a fourth pipe configured to supply one treated water so as to allow a same treated water to flow through the first pipe and the second pipe; and the second pipe has a filter capable of capturing a fine particle or a microorganism.

5. The water quality measurement system according to claim 4, wherein:

the filter is a microfiltration membrane or an ultrafiltration membrane capable of capturing the fine particle, and the water quality measurement device is a fine particle measurement device.

6. The water quality measurement system according to claim 1, further comprising:

a controller configured to repeatedly switch opening/closing of the first valve and the second valve alternately in a predetermined time.

7. A water quality measurement method, comprising:

a first supply step of supplying a first treated water into a first pipe with a first branch pipe having a first valve, the first treated water being a first ultra pure water;

a second supply step of supplying a second treated water into a second pipe with a second branch pipe having a second valve, the second treated water being a second ultra pure water;

a switching step of closing the first valve and opening the second valve, or opening the first valve and closing the second valve, to allow one of the first treated water and the second treated water to flow through a third pipe connected to a connection between the first pipe and the second pipe; and a water quality measurement step of measuring a water quality of the first treated water or the second treated water flowing through the third pipe, wherein:

no switching valve is provided on a flow path of the first treated water to a water quality measurement device and on a flow path of the second treated water to a water quality measurement device, and the third pipe has no valve on its entirety including the connection.

8. The water quality measurement method according to claim 7, further comprising:

a control step of repeating steps of:

closing the first valve and opening the second valve; and opening the first valve and closing the second valve, alternately in a predetermined time in the switching step.

9. The water quality measurement system according to claim 1, wherein:

there is no valve between the first pipe and the third pipe.

10. The water quality measurement system according to claim 1, wherein:

there is no valve between the second pipe and the third pipe.

11. The water quality measurement system according to claim 1, wherein:

there is no valve between the water quality measurement device and the third pipe.

12. The water quality measurement system according to claim 1, wherein:

there is no valve between the first pipe and the third pipe, there is no valve between the second pipe and the third pipe, and there is no valve between the water quality measurement device and the third pipe.

13. The water quality measurement system according to claim 1, wherein:

the first pipe is upstream of the third pipe, the second pipe is upstream of the third pipe, and the water quality measurement device is downstream of the third pipe.

14. The water quality measurement system according to claim 1, wherein:

the first branch pipe is connected to a first drain, and the second branch pipe is connected to a second drain.

* * * * *